United States Patent [19]

Ishikawa et al.

[11] Patent Number: 4,698,838

[45] Date of Patent: Oct. 6, 1987

[54] STEERING WHEEL HAVING A TELEPHONE

[75] Inventors: Masanobu Ishikawa, Nagoya; Masumi Nishikawa, Toyoake; Satoshi Ono, Inazawa; Tetsushi Hiramitsu, Ichinomiya; Atsuo Hirano, Nagoya, all of Japan

[73] Assignees: Aisin Seiki Kabushiki Kaisha, Kariya; Toyoda Gosei Co., Ltd., Nishikasugai, both of Japan

[21] Appl. No.: 780,841

[22] Filed: Sep. 27, 1985

[30] Foreign Application Priority Data

Sep. 29, 1984 [JP] Japan .................... 59-205183
Sep. 29, 1984 [JP] Japan .................... 59-205184
Sep. 29, 1984 [JP] Japan .................... 59-147507[U]
Sep. 29, 1984 [JP] Japan .................... 59-147508[U]
Sep. 29, 1984 [JP] Japan .................... 59-148430[U]

[51] Int. Cl.$^4$ ........................................... H01M 1/23
[52] U.S. Cl. ................................ 379/58; 379/56; 455/90; 455/89
[58] Field of Search .................. 179/2 E, 2 EA, 147, 179/146 R, 149, 152; 455/89, 90, 346; 379/56, 58, 63, 59, 60

[56] References Cited

U.S. PATENT DOCUMENTS

| D. 254,435 | 3/1980 | Ferron | D14/53 |
| 3,824,465 | 7/1974 | Blough | 455/89 |
| 4,455,454 | 6/1984 | Umebayashi | 179/2 E |
| 4,481,382 | 9/1984 | Villa-Real | 379/61 |
| 4,581,490 | 4/1986 | Genender | 179/100 R |
| 4,629,829 | 12/1986 | Umebayashi | 379/56 |

FOREIGN PATENT DOCUMENTS

| 2430146 | 2/1986 | France | 379/90 |
| 55-141838 | 11/1980 | Japan | 179/149 |

OTHER PUBLICATIONS

K. Kobayashi et al., "Detachable Mobile Radio Units for the 800 MHz Land Mobile Radio System" IEEE Conference on Vehicular Technology, May 1984, pp. 6-11.
27th Annual Conference IEEE Vehicular Technology Group (U.S.A.) Mar. 16-17, 1977, pp. 168-172, "An Improved Mobile Telephone Control Unit", Kahn.

Primary Examiner—Robert Lev
Attorney, Agent, or Firm—Oblon, Fisher, Spivak, McClelland, & Maier

[57] ABSTRACT

A steering wheel having a telephone includes a pad portion secured to a steering shaft, wherein the pad portion comprises a base held on the steering shaft and a telephone detachably held on the base, the base has a receiving recess and a swing projection with which the telephone is engaged, and the telephone has an engaging recess in engagement with the swing projection and a radio communication means for transferring signals. Therefore, the driver can use the telephone of the present invention in his driving attitude without picking up it during operation of the steering wheel and other occupants can also pick up it from the steering wheel.

14 Claims, 15 Drawing Figures

STEERING WHEEL HAVING A TELEPHONE

BACKGROUND OF THE INVENTION

1. Field of the Invention

The present invention relates to a steering wheel having a telephone. The steering wheel having a telephone according to the present invention is most suitable for passenger cars and commercial cars.

2. Description of the Prior Art

A telephone mounted on an automobile is known. This conventional car-telephone is arranged, in a manner similar to a desk telephone at the end of a console box. Because of this arrangement, it is necessary to pick up the telephone by one hand in case the user receives a signal during the running, in which case the driver has to operate the steering wheel.

Further, it is known that a universal arm is mounted on a center pillar and a receiver of a telephone is held on the arm. In this type of telephone, the universal arm is projected frontwardly of the driver, and causes a problem that the view of the driver is disturbed. In addition, the driver has to operate both the universal arm and the steering wheel.

According to another example, it is described in the examined Japanese Patent Publication No. 1972/1979 that a main telephone is mounted within the automobile and a sub-telephone is fixed to the pad portion of the steering wheel. In this case, such two kinds of devices as a main and a sub-telephone have to be provided, and a large space therefor is required.

SUMMARY OF THE INVENTION

It is an object of the present invention to provide a steering wheel having a telephone free from problems as noted above.

A steering wheel having a telephone according to the present invention comprises a boss portion secured to a steering shaft, a steering portion operated by a driver, a spoke portion for integrally connecting the boss portion and the steering portion, and a pad portion held on the boss portion, comprising a base held on the boss portion and a telephone detachably held on the base.

In the steering wheel having a telephone according to the present invention, a telephone is detachably mounted as a part of the pad portion. Therefore, the driver can use the telephone on his driving seat without picking up the telephone during operation of the steering wheel. Other occupants can pick up the telephone from the steering wheel for use. The present invention does not require two telephones, main and sub telephones, and a cord connecting a receiver and the main portion of the telephone.

BRIEF DESCRIPTION OF THE DRAWINGS

FIG. 2(*a*) is a perspective view showing a base from which a handset 2 is disengaged;

FIG. 2(*b*) is a perspective front view of the handset 2;

FIG. 2(*c*) is a perspective rear view of the handset 2;

FIG. 2(*d*) is an enlarged view of a pressing means;

DETAILED DESCRIPTION OF THE INVENTION

The steering wheel having a telephone according to the present invention comprises a boss portion, a spoke portion, a steering portion, and a pad portion. These boss portion, spoke portion and steering portion are basically the same as those of prior art.

The pad portion which constitutes a feature of the present invention is composed of a base held on the boss portion and a telephone detachably held on the base.

The base may have a receiving recess for holding a telephone therein. Preferably, in order that the telephone is projected from the receiving recess for easy removal and mounting, the base is provided with a swing projection on which is held a telephone. This swing projection is urged in a given direction, and in the case the swing projection is not restricted, the swing projection makes the telephone being held to move upwardly on the base and be held there. To hold the telephone within the receiving recess, an engaging device such as an engaging pawl is provided on the base to restrict the oscillation of the swing projection and hold the telephone in the receiving recess. To release the engaging device a releasing device is provided which drives the engaging pawl in a direction opposite the engaging direction. Thereby, the telephone held in the receiving recess and released the engagement of the engaging device by operating the releasing device, is erected from the receiving recess by the urging force of the swing projection and swings above the base to be held. Thereby, the telephone can be easily detached from the swing projection.

The telephone has electric devices such as a microphone, a speaker, etc. for receiving and transmission, and radio communication means for signals to and from an automobile telephone control portion provided in the automobile. Preferably, the telephone has a usual dial for calling, an abbreviated telephone number selection key, an amplifying audio system for conversation from a distance, a switching means for switching the amplifying audio system and closed telephoning system. Preferably, the switching means is of the type in which a change-over switch is automatically operated to turn on the amplifying audio system when the telephone is housed in the receiving recess of the base. Preferably, a battery is held in the telephone to supply a power necessary for operation of the telephone and charged while the telephone is being held in the receiving recess of the base. Preferably, the telephone is operated by electricity supplied from the base held in the receiving recess of the base.

In place of the amplifying audio system mounted on the telephone, a microphone and a speaker having an amplifying system can be provided in the base or other compartments. Another side of the radio communication means for transferring signals between the base and the telephone is provided on the base. This side of the radio communication means can be provided in other place in the compartment.

The steering wheel having a telephone according to the present invention has a telephone incorporated in the steering wheel as a part of the pad portion. With this arrangement, the driver can use the telephone in a hand-free condition without holding the telephone. Other occupants can remove the telephone from the base of the pad portion to use it at their own seats. Since the telephone wirelessly transfers signals, no cord is necessary, thus not disturbing the driving. By the provision of the amplifying audio system, it is possible to use the telephone at a distance and to use the telephone close to an ear similarly to a conventional telephone. Moreover, since the telephone is incorporated integral with the pad, a further space is not necessary to set the telephone in an automobile, which enlarges a space of the compartment.

The engaging and releasing devices between the telephone and the receiving recess of the base may be cerved as a conductive terminals, and no other terminals than the engaging and releasing devices need not be provided and trouble of manufacturing may be saved. Since the contacts of terminals are always urged by means of the urging members of the swing device and lock device provided on the receiving recess of the base, and therefore, a contact area of the terminals is increased to eliminate an occurrence of defective contact.

The base of the present invention may have a receiving recess and a swing device comprising a connecting shaft held rotatably on the base and a first swing arm and a second swing arm which are inserted into and held on the connecting shaft.

In the swing device, at least one of the swing arms has an urging member for urging the swing arm in a given swinging direction. Preferably, the urging member comprises a tension coil spring one end of which engages the base whereas the other end engages with the first swing member, but alternatively, a separate coil spring is used for urging in the same direction, or other means can be used. The engaging surfaces between the second swing arm and the connecting shaft may be deviated through a predetermined angle with respect to the engagigng surfaces between the first swing arm and the connecting shaft so that when the receiving and transmitting portion is held on the bed, the first swing arm and the second swing arm are in parallel with each other.

Preferably, an engaging hole between the first swing arm and the second swing arm has a plane portion deviated through a predetermined angle, and the connecting shaft has a straight plane portion in engagement with the plane portion, which however is not in a limited form. For example, it can be designed so that the first swing arm and the second swing arm have a plane portion, and the connecting shaft has a plane portion in engagement with the plane portion of the both swing arms, the plane portion of the connecting shaft being deviated through a predetermined angle.

In addition, the plane portion is provided on the engaging portion so that the connecting shaft and both the swing arms may be rotated together. However, it is noted that a plane portion is not always provided and for example, an engaging construction such as a key and key way may be employed.

As described above, at least one swing arm is urged in a one rotational direction by the urging member, the first swing arm and the second swing arm are connected by the connecting shaft, and the engaging surfaces of the both swing arms and connecting shaft are deviated through a predetermined angle. With this arrangement, a detachable telephone engages the aforesaid both swing arms, an external force in a direction opposite the urging direction acts on the urging member to offset the "twisted portion" between both the swing arms so that both the swing arms are in parallel with each other, and the telephone may be engaged properly with the base. This also provides an effect that a "play" is hard to occur between the telephone and the base.

In the swing device, between at least one swing arm of the both swing arms and the base is provided an urging member for urging the swing arm in a given swinging direction, and an attenuating member resisting the urging force of the urging member is provided between the base and the swing arm.

The attenuating member preferably comprises a so-called damper in which oil is sealed therein and flows in and out through an orifice. Alternatively, air can be used for the damper.

If the attenuating member is provided, where a detachable type telephone provided on the pad portion of steering portion of the automobile is practiced, even if the telephone tends to be jumped out vigorously by the urging force, the moving speed of the telephone is attenuated by the attenuating force of the attenuating member to prevent the telephone from being fallen.

Furthermore, the so-called eject action produced when the telephone is removed from the base is softened to afford a user with high-class feeling.

The lock device on the base is provided so that when the telephone is brought into engagement with the base, the telephone is forced into engagement with the base against the urging force of the swing arm.

Preferably, the aforesaid lock device is provided with a lever having a lock pawl at the end thereof and swinging in a direction which intersects the swinging direction of the swing arm, the lock pawl having an urging surface which comes into contact with an engaging shoulder to urge the telephone in a direction which intersects the urging direction of the swing arm on the base.

The base may be formed with a groove for housing therein a telephone, a pair of swing arms are provided on both side walls at one end of the groove, and a lock device is provided on one side wall at the end of the groove while a first guide is provided on the other side wall.

Preferably, the telephone comprises a pair of engaging recesses on both side walls at one end thereof, an engaging shoulder provided on one side wall at the other end in engagement with both engaging surface and urging surface of the base, and a second guide in engagement with the first guide of the bed. The telephone is detachably provided on the base, and the lock device, which applies the urging force through the swing arm to one end of the telephone mounted on the base to hold the other end of the telephone. With this arrangement, a "play" which tends to occur between the base and the telephone can be "killed" in all directions, and mounting and removable of the telephone on and from the base may be carried out promptly and positively. The "all directions" herein termed will be further described. The play of the telephone in the swinging direction may be prevented by the urging force of the urging member of the swing device and by the lock pawl of the lock device which performs a locking action so as to resist the aforesaid urging force, and the play perpendicular to the first-mentioned play may be prevented by urging the lock pawl into engagement by the urging member of the lock device.

Moreover, since the telephone is always urged upwardly by the swing arm, the telephone may be levitated from the bed and easily removed merely by releasing the engagement of the lock pawl of the lock arm.

Preferably, one of the engaging projection and the engaging recess between the telephone and the base comprises a press member urged by a given urging force against the engaging surface thereof. This press member is provided to press the telephone against the engaging projection of the base on the opposite side. This press member may comprises a slider portion and a compression spring for urging the slider portion. Furthermore, preferably, the slider portion is in the shape in which a convex portion is provided in the central portion so as to provide a smooth sliding.

The telephone portion is urged by the urging member against the engaging projection on the side opposite that at which the press member is provided, whereby the telephone is urged by a given force. Thereby, the telephone and the base are firmly secured to eliminate the presence of a clearance therebetween which possibly brings forth vibrations or the like. As a result, no inconvenience is encountered in which noises occur due to the relative vibration between the telephone and the base. Particularly, the engaging recess is formed into a groove-like configuration and the engaging projection into a projected configuration, whereby the telephone is held more positively. The engaging projection is provided on the end of the swing lever held pivotally on the base, whereby the telephone may be easily removed when it is removed from the base.

EMBODIMENTS

The present invention will now be described by way of an embodiment with reference to the accompanying drawings.

Figure 1:
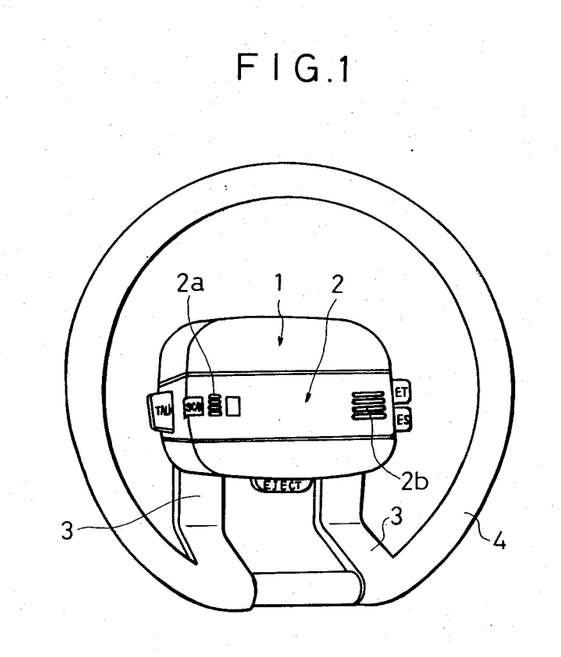
FIG. 1 is a perspective view of a steering wheel of the present invention.

FIG. 1 shows a steering wheel of an automobile to which the present invention is applied. In FIG. 1, reference numeral 1 designates a base, on which a handset (a telephone) 2 is detachably provided. A ring portion 4 is attached to the base 1 through two spokes 3. The ring portion 4 and the spokes 3 are turned during steering, but the base 1 is not turned (so-called pad portion non-rotatable type).

Reference numeral 2a designates a microphone, and 2b designates a speaker.

Figure 2A:
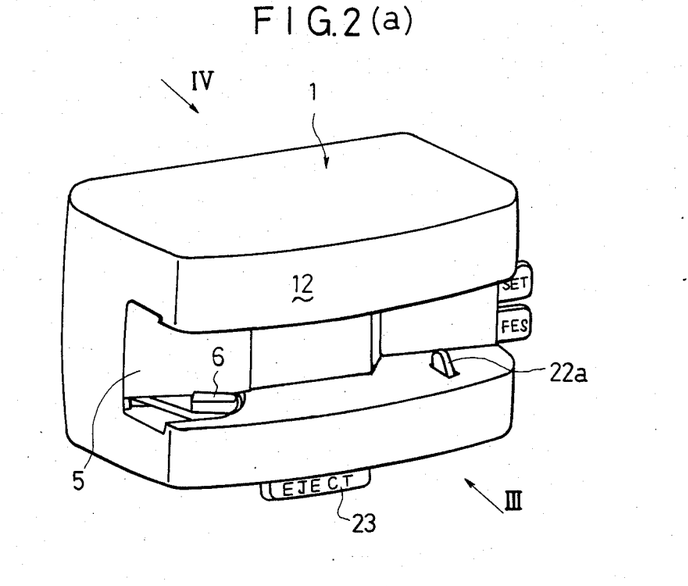
Figure 3:
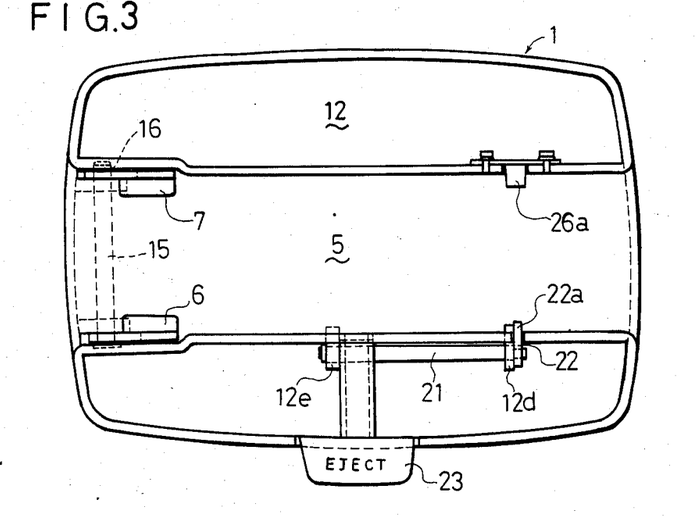
FIG. 3 is a front view of the base 1 as viewed in the III direction of FIG. 2(*a*)

FIG. 2(a) shows a base 1 from which the handset is removed, and FIG. 3 shows the state in which the base 1 is viewed in the direction of III in FIG. 2(a). A groove 5 is formed in a longitudnal direction of the base 1, and engaging projections 6, 7 which form parts of a swing device Y (FIG. 4) (a swing projection) are disposed on both side walls at one end of the groove 5. As can be seen from FIG. 3 and FIG. 5 which is an exploded perspective view of the swing device Y, these engaging projections 6, 7 are projected so that they are opposed to each other.

Figure 4:
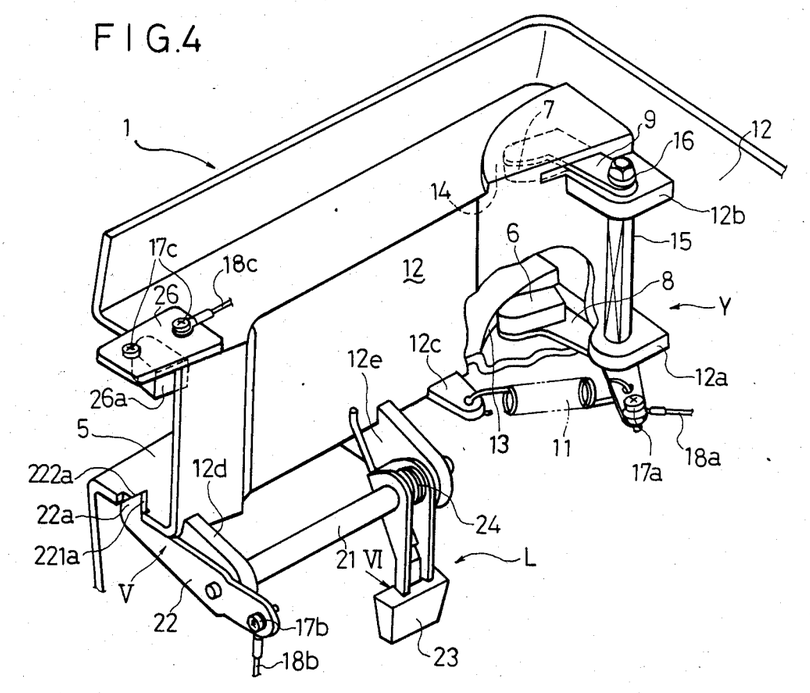
FIG. 4 is a perspective rear view of the base as viewed in the IV direction of FIG. 2(*a*)

The engaging projections 6, 7 are swung along each depressed side wall portions 13, 14 of a body 12 by a biasing force of a spring 11 which will be described later. In this case, the hand set 2 is not assembled as shown in FIG. 4, where only one projection 6 comes into contact with a stopper (not shown) to resist the biasing force of the spring 11.

Figure 5:
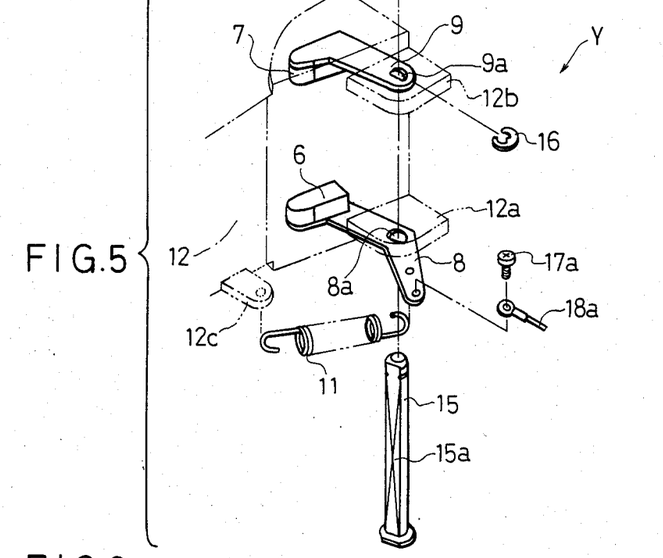
FIG. 5 is an exploded perspective view of the swing device Y of FIG. 4.

Members which constitute the swing device Y includes, in addition to the aforesaid levers 8, 9, a shaft 15 which is holded rotatably with both fixed projections 12a, 12b of the body 12 and connected to the levers 8, 9 at the both ends thereof, a tension coil spring 11 whose one end is locked at a fixed projection 12c of the body 12 and the other end is locked at the end of said lever 8, and an E-ring 16 assembled to the end of the shaft 15 to prevent the shaft 15 from slipping out.

Holes 8a, 9a of the levers 8, 9 have respectively a crossectional shape of a semicircle and a flat surface. The shaft 15 has a semicirclar crossectional shape and flat surface 15a. So, the shaft 15 is fitted in the holes 8a, 9a and the flat surfaces of the holes 8a, 9a come into contact with the flat surface 15a of the shaft 15. With this arrangement, the biasing force of the spring 11 is transmitted to the engaging projection 6 at the end of the lever 8, and transmitted to the engaging projection 7 at the end of the other lever 9 through the shaft 15.

More specifically, the holes 8a, 9a of the levers 8, 9 are formed with curved inner surfaces 801, 901 (FIG. 8) and flat inner surfaces 802, 902, respectively, so that when both the levers 8, 9 are removed from the shaft 15 to make the sides 803, 903 parallel to each other, the flat inner surfaces 802, 902 are deviated by a predetermined angle $\theta$.

Figure 9:
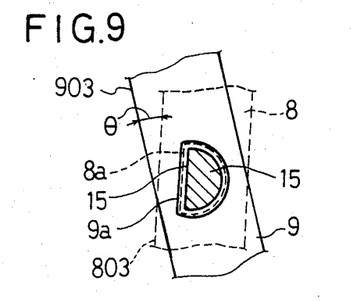
FIG. 9 is a plan view of an engaging portion as viewed from top of FIG. 5.
Figure 10:
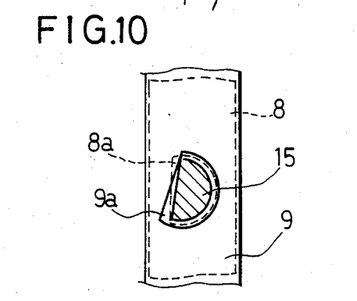
FIG. 10 is a plan view of showing the operation of the FIG. 5.

In the ideal state where neither clearance nor frictional force between the shaft and the levers, the both levers 8, 9 are deviated by an angle $\theta$, as shown in FIG. 9. There are clearances between the shaft 15 and the levers 8, 9. There are clearances between respective pairs of engaging portions, such as the lever 9 and the fixed projection 12b. Because of these, the amount of rotation of the lever 8 directly pulled by the tension coil spring 11 is smaller than that of the lever 9 pulled by the transmission of the force of the coil spring 11 through the shaft 15. Namely, the lever 9 does not rotate as much as the lever 8. To prevent this unfavorable difference in rotation, the flat inner surfaces 802, 902 are disposed so that the lever 9 is more rotated than the lever 8 by the angle described above, and the levers 8 and 9 are aligned parallel to each other as shown in FIG. 10.

Figure 6:
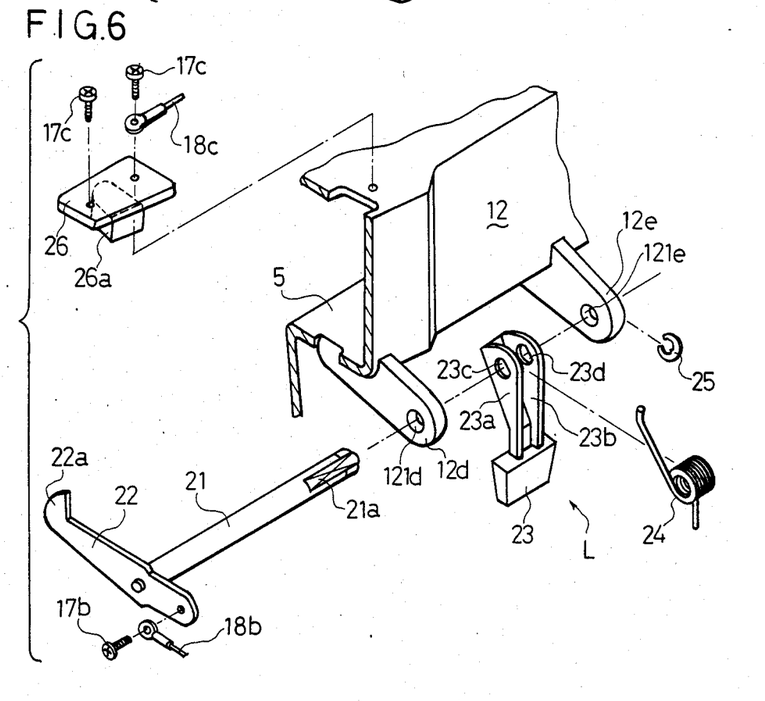
FIG. 6 is an exploded perspective view of the lock device L of FIG. 4.

On the other hand, a lock device L is provided on the other end of the groove 5 as shown in FIGS. 4 and 6. The lock device L comprises fixed projections 12d, 12e bored with through-holes 121d 121e at the end thereof, a shaft 21 fitted into the throughholes, a lever 22 having a pawl formed with a lock pawl 22a at the swing end, an eject lever 23 provided between the fixed projections 12d, 12e by the extension of the shaft 21 therethrough, a coil spring 24 provided between side walls 23a, 23b of the eject lever 23 by the extension of the shaft 21 threthrough and biasing the lock pawl 22a in a locking direction (in a direction of arrow V in FIG. 4) through the shaft 21 when one end thereof is engaged with the body 12 and the other end engaged with the eject lever 23, and an E-ring 25 mounted on the end of the shaft 21, said E-ring 25 functioning to prevent the shaft 21 from slipping out. The fore-end of the lock pawl 22a comprises a plane engaging surface 221a and a curved biasing surface 222a.

Holes 23c, 23d (FIG. 6) bored in the side walls 23a, 23b, respectively, of the eject lever 23 and through which the shaft 21 extends comprise a curved portion and a plane portion, and a plane portion 21a of the shaft 21 comes into contact with the plane portions of the holes 23c, 23d, and therefore the biasing force of the spring 24 is transmitted to the lock pawl 22a through the eject levers 23 and the shaft 21.

A wire harness 18a (FIG. 4) for a supply of power and/or transmission of signal is connected to the end of the lever 8 by means of screw 17a.

Another harness 18b (FIG. 4) is connected by means of a screw 17b to the end opposite end of the side where the lock pawl 22a of the lever 22 is formed.

A guide member 26 having a guide block 26a is secured to the body 12 by means of a screw 17c at a position facing to the lock pawl 22a at the end of the lever 22 with a pawl as shown in FIG. 4. A harness 18c is connected by means of the screw 17c. The levers 8, 22 and the guide member 26 which are respectively connected to the harness 18a, 18b, 18c are made of metals. And the body 12 is made of an insulating material, plastics. Therefore, each harness is insulated from the other.

Figure 2B:
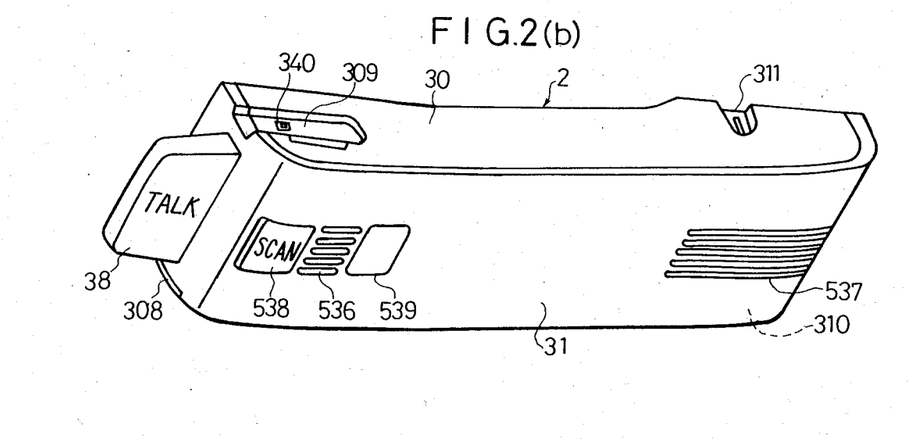
Figure 2C:
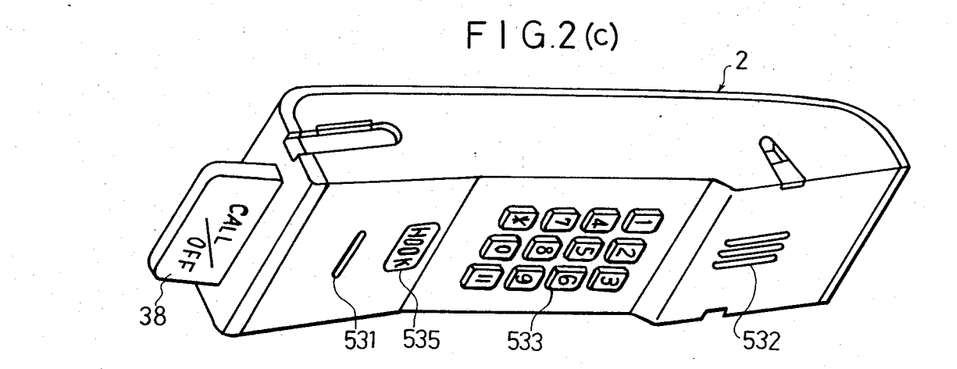
Figures 7, 8:
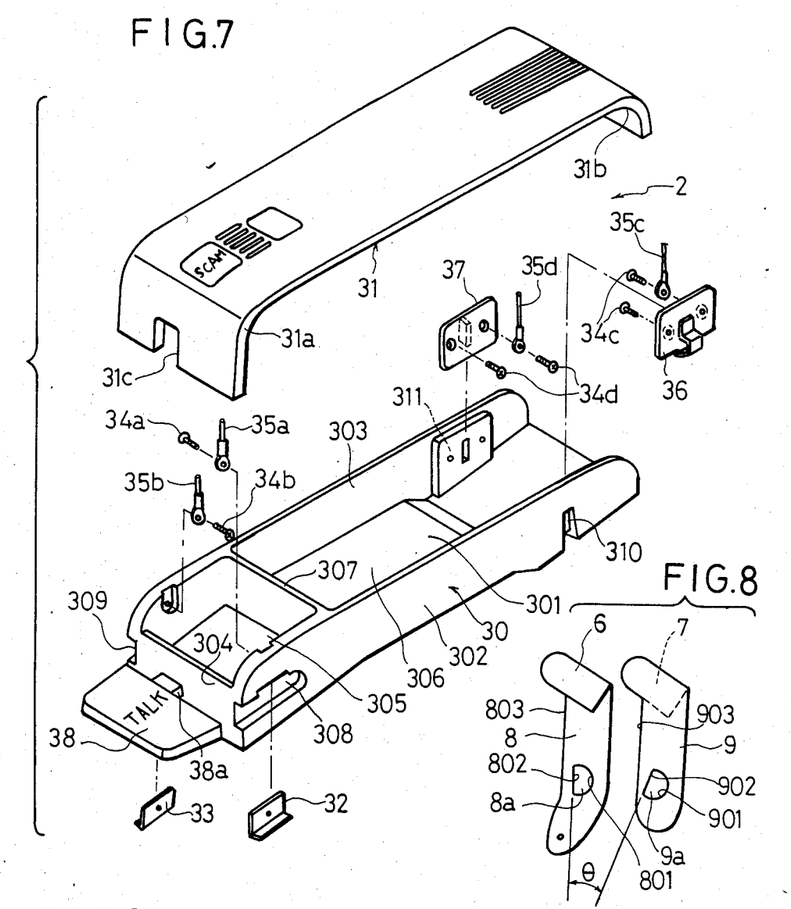
FIG. 7 is an exploded perspective view of the handset 2 of FIGS. 2(*b*) and 2(*c*)
FIG. 8 is a front view of a signal body of levers 8, 9 shown in FIG. 5.

Next, the internal construction of the handset 2 shown in FIGS. 2 (b) and (c) will be described with reference to FIG. 7. The handset 2 is completed by putting a cover 31 on a body 30.

The body 30 comprises a bottom wall 301, side walls 302, 303 formed along the lengthwise of the bottom wall 301, an end wall 304 for connecting one end of the side walls 302, 303, and a dividing walls 307 for dividing a space formed by the side walls 302, 303 and 304 and the bottom wall 301 into a small space 305 and a large space 306. The body 30 is formed with guide grooves 308, 309 externally of the side walls 302, 303, respectively. At the end of the side walls 302, 303 which form the large space 306 are formed an engaging hole 310 into which the aforementioned lock pawl 22a can be fitted and an engaging groove 311 (FIG. 2(b)) provided opposedly of the engaging hole 310 and with which the aforementioned guide block 26a can be engaged. In assembling on the base 1, the guide grooves 308, 309 are engaged with the guide projections 6, 7, respectively, one side.

Figure 2D:
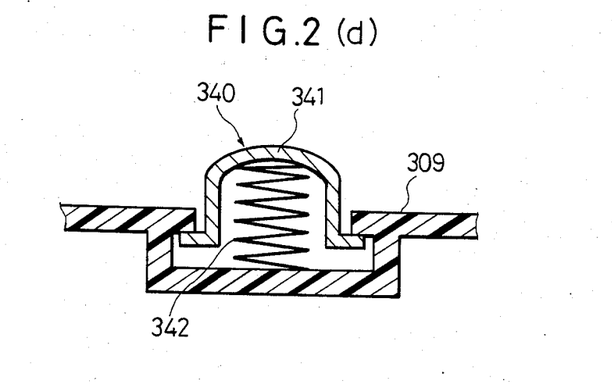

A press member 340(FIG. 2(d)) is formed in the central portion of the bottom surface of the engaging groove 309. The press member 340 is composed of a metal slider 341 which central portion is projected and a compression spring 342 for biasing the slider 341, as shown in FIG. 2(d) showing an enlarged section of the press member 340. The slider 341 is engaged with both open ends open to the bottom of the engaging groove so as not to be projected more than a given length. The engaging projection 6 of the base 1 is inserted into and engaged with the pair of engaging grooves 308, 309.

By the press member 340 provided in the engaging groove 309, the engaging projection 6 in contact with the press member 340 and the swing lever are urged against one side wall surface of a recess 5, and the telephone 2 itself, the other engaging projection 7 and the swing lever are urged against the other side wall surface. Thereby, the telephone 2 is fixedly held in the recess 5 of the base 1 by the urging force of the press member 340.

A thin metal 32(FIG. 7) for ground is secured to the guide groove 308 of the body 30 and similar metal sheet 33 is secured also to the other guide groove 309. Wire harness 35a, 35b are connected by means of screws 34a, 34b to the side walls 302, 303, respectively, on the side of the small space 305. Metal sheets 36, 37 along with wire harnesses 35c, 35d are secured by means of screws 34c, 34d internally of the engaging hole 310 and the engaging groove 311.

A microphone (not shown) is set within the small space 305, and when a talk lever 38 is depressed, conversation can be made. Also, a speaker (not shown) is set within the large space 306 to provide a call signal from the other party.

The cover 31 is made of a plastics, on both ends of which are formed bended portions 31a, 31b. The bended portion 31a has an end provided with a recess 31c capable of being fitted into the base 38a of the talk lever 38.

Next, operation of the mechanism of the pad portion in the present embodiment will be described.

In assembling the handset 2 on the base 1, the engaging grooves 308, 309 on the side of the talk button 38 of the handset 2 are first brought into engagement with the engaging projections 6, 7 of the base 1, and under this state, the opposite end of the talk button 38 is pressed against the spring 11 of the swing device Y, whereby the engaging grooves 310, 311 of the handset 2 and the lock pawl 22a and the guide block 26a of the base 1 are brought into engagement with one another to lock them. This state is maintained due to the catching action of the lock pawl 22a against the biasing force of the spring 11.

Where the handset 2 is removed from the pad portion 1 as shown in FIG. 2, when the eject button 23 is pressed in a direction of VI in FIG. 4, the lever 22 with the pawl 22a is swung in a direction opposite the direction of V, thereby the lock pawl 22a is released from the engagement with the engaging hole 310. Thus, the handset 2 is swung at a given acceleration due to the biasing force of the spring 11 (the swing center is the axis of the shaft 15). In the present apparatus however, since a damper D(not shown) is provided, the handset 2 is slowly and gradually swung by the attenuation action thereof.

When the handset 2 is removed upon the completion of such a swinging motion as described above, the state shown in FIG. 2 is obtained, and under this state, an occupant seated on an assistant seat as well as occupants seated on the rear seat can bring the handset 2 and perform telephone communications.

Figure 11:
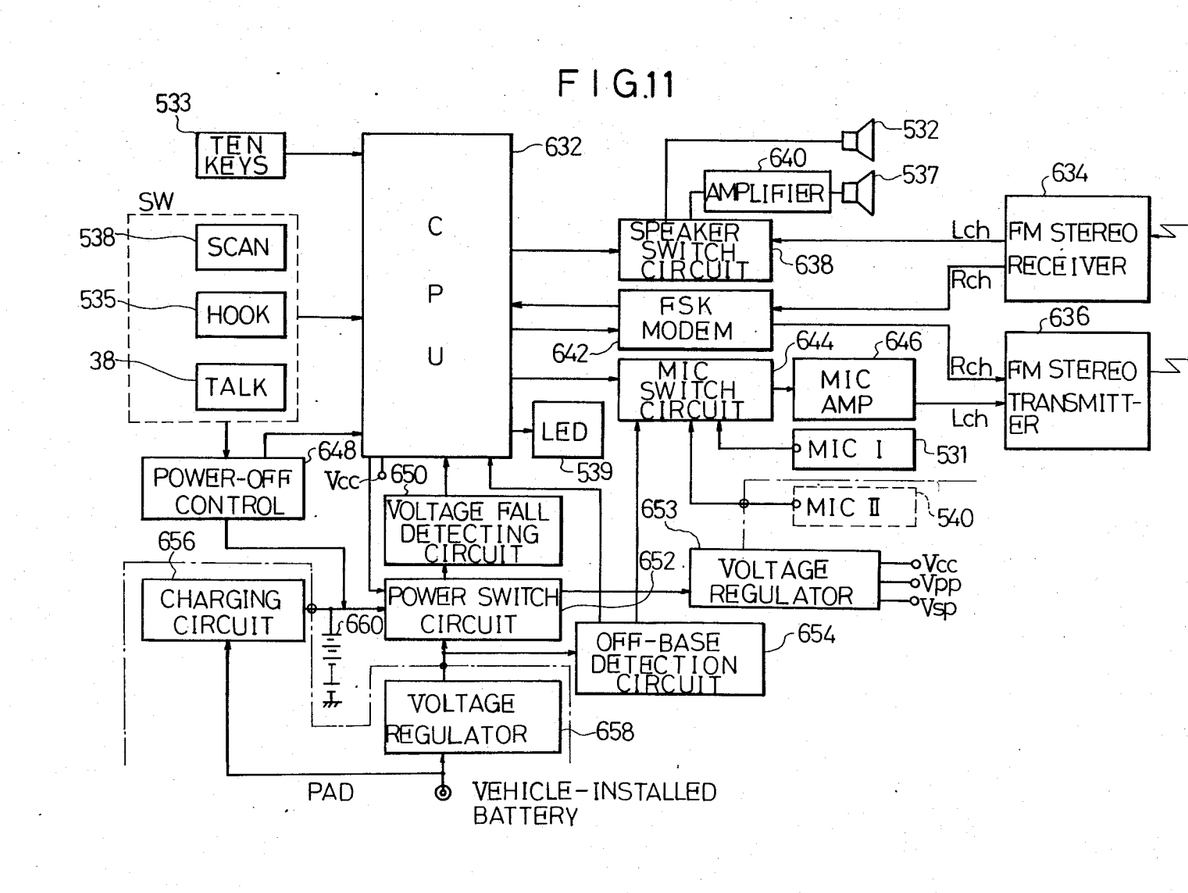
FIGS. 11 and 12 are block diagrams showing the circuit arrangement of the equipment.
Figure 12:
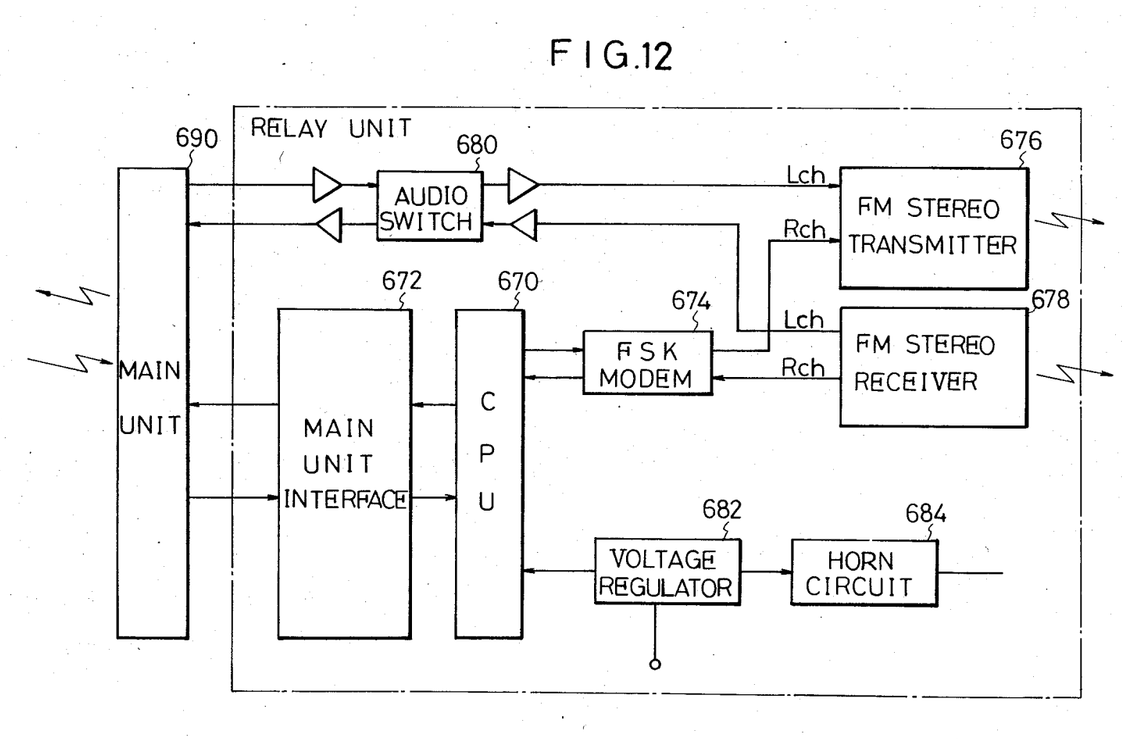

FIG. 11 shows in block diagram of the circuit arrangement provided in the base 1 and handset 2, and FIG. 12 shows the circuit arrangement of the relay unit installed on the user's automobile. Control within the handset 2 is implemented by a CPU 632, which is in connection with a push button key set 533, station call switch 538, hook switch 535 and talk switch 38. The control signals produced by these operating switches are processed by the CPU 632, and after being frequency-modulated by a modem 642, delivered to an FM stereo transmitter 636.

In closed-speech mode(the handset 2 is removed from the base 1), microphone switch circuit 644 selects the audio signal from the microphone I 531 and delivers it through an amplifier 646 to the FM stereo transmitter 636. The control signals are treated dividedly in the right channel and left channel, and the FM radio wave transmitted by the transmitter 636 is received by an FM stereo receiver 678 (FIG. 12) in the relay unit.

The FM radio wave transmitted by an FM stereo transmitter 676 in the relay unit is received by an FM stereo receiver 634, and the audio signal is delivered through a speaker switch circuit 638 to the speaker 532 in closed-speech mode, or to the speaker 537 via an amplifier 640 in loud speech mode.

The circuitry within the handset 2 is powered by the vehicle-installed battery through a voltage regulator 658 provided in the base 1 when the handset 2 is held in the base 1. The battery is also used to charge a rechargeable cell 660 in the handset 2 though a charge circuit 656 provided in the base. When the handset 2 is taken out of the base 1, an off-base detection circuit 654 operates on a power switch circuit 652 through the CPU 632, and the handset 2 is powered by the rechargeable cell 660. The voltages supplied by these power sources are converted into several voltages by a voltage regulator 653.

The relay unit 690 incorporates a main unit interface 672, a CPU 670, an FM stereo transmitter 676, an FM stereo receiver 678, a modem 674 and a audio switch 680. Among the FM radio wave received by the FM stereo receiver 678, the audio signal is delivered through the audio switch 680 to the audio signal input terminal of the main unit 690, while the control signal encoded by the modem 674 is fed to the CPU 670 and after being processed delivered through the main unit interface 672 to the control input signal terminal of the main unit 690.

When the off-base detection circuit 654 in the handset 2 detects that the handset is held in the base 1, the CPU 632 selects the speaker 537 and activates both of the microphone I 531 and the microphone II 540 installed in the base so as to form a gradient microphone for the speech operation in loud-speech mode.

In this state, when the system receives an incoming call, a ring is sounded by the speaker 537. Then, the user talks in loud-speech mode by operating the talk switch 38. On completion of communication, the talk switch 38 is operated again so that the system is removed from the telephone network. In more detail, the CPU 632 has memorized the state of the talk switch 38, and sends the off-hook signal or on-hook signal depending on the switch position to the CPU 670 in the relay unit, then the CPU 670 sends the off-hook signal or on-hook signal to the main unit 690, which in turn transmits the activation signal or termination signal to the base station to conncect or release the telephone network.

To make a call, the user operates the station call switch 38 to read out the preset abbreviated telephone numbers on the indicator 537. Upon selection of a called party's number, the CPU 632 sends the telephone number corresponding to the abbreviated number to the main unit 690 via the CPU 670 in response to the operation of the talk switch 38. The main unit 690 transmits the telephone number to the base station, which then rings the called party through the exchange and network and, at the same time, issuess a ring signal to the mobile main unit 690 with the result of a ring emitted by the speaker 537. When the called party responds to the ring, the connection is established between both parties through the network. In response to the operation of the talk switch 38 upon termination of communication, the CPU 632 issue the on-hook signal and the main unit 690 transmits the termination signal to shut down the line connection. As will be appreciated, the talk switch 38 functions identically to the hook switch 38 equipped in the usual telephone set.

Next, the operation in closed-speech mode will be described when the handset 2 is taken out of the base 1 the off-base detection circuit 654 issues the signal to the CPU 632, which then selects the microphone I 531 and speaker 532. The ring signal is sounded by the speaker 537. The same operating procedures are used to respond to an incoming call and to make calling. In this mode, a call can be made also by dialing a formal telephone number of a called party by use of the hook switch 535 and push button key set 533. To terminate a call, the user operates the talk switch 38, and the on-hook signal is produced so that the main unit 690 transmits the termination signal.

What is claimed is:

1. A steering wheel having a telephone, comprising:
    a boss portion secured to a steering shaft;
    a steering portion operated by a driver;
    a spoke portion for integrally connecting said boss portion and said steering portion, and
    a pad portion held on said boss portion;
    said pad portion comprising a base held on said boss portion and a telephone detachably held on said base;
    said base comprising a receiving recess in which said telephone is received, a swing projection with which said telephone is engaged, a lock devise comprising a swing arm urged in a given rotational direction and having an engaging projection at the end thereof, a lock pawl and a lock releasing lever for driving said lock pawl; and
    said telephone having an engaging recess in engagement with said swing projection.

2. A steering wheel having a telephone, comprising:
    a boss portion secured to a steering shaft;
    a steering portion operated by a driver;
    a spoke portion for integrally connecting said boss portion and said steering portion;
    a pad portion held on said boss portion;
    said pad portion comprising a base held on said boss portion and a telephone detachably held on said base;
    said telephone comprising a radio communication means for transferring signals between a microphone and speaker necessary for receiving a transmission and telephone control portion provided on an automobile; and
    said base having a second speaker provided with an amplifying system and a second microphone provided with an amplifying system.

3. A steering wheel having a telephone according to claim 2,
    wherein said telephone has a contact portion for detecting the recess of said base and
    a switching means for actuating said amplifying system by detection of said contact portion.

4. A steering wheel having a telephone according to claims 1 or 2, wherein:
    said base includes a rotatably held connecting shaft rotatably and
    a swing projection having a first swing arm and a second swing arm which are inserted in and held on said connecting sshaft, rotation of which is transmitted each other through the engaging projection;
    said swing projection comprises a biasing member provided on said first swing arm to bias said first swing arm in a given swinging direction;
    said connecting shaft is deviated through a predetermined angle with respect to an engaging surface between said second swing arm and said connecting shaft so that said first swing arm and said second swing arm are in parallel with each other when said telephone is taken out from said base.

5. A steering wheel having a telephone according to claim 4, wherein
   said engaging portion of said first and said second swing arms respectively have a hole having a flat portion,
   said flat portions of said holes are deviated to each other through a predetermined angle, and said connecting shaft has a flat portion having the same shape as said flat portions of the holes of the first and the second swing arms.

6. A steering wheel having a telephone according to claim 4, wherein said biasing member is a coil spring.

7. A steering wheel having a telephone according to claim 1, wherein
   said base has a receiving portion and a swing projection having a connecting shaft rotatably held on said receiving portion and a first swing arm and a second swing arm which are inserted in and held on said connecting shaft,
   a biasing member is provided between said first swing member and said receiving portion, and
   an attenuating member is provided between said second swing member and said receiving portion.

8. A steering wheel having a telephone according to claim 7, wherein said biasing member is a coil spring.

9. A steering wheel having a telephone according to claim 7, wherein said attenuating member is a damper.

10. A steering wheel having a telephone according to claim 1, wherein
    said lock device has said lock lever having said lock pawl at the end thereof and swinging in a direction which intersects the swinging direction of said swing arm, and
    said lock pawl has an urging surface which comes into contact with an engaging shoulder to urge the telephone in a direction which intersects the urging direction of said swing arm on said base.

11. A steering wheel having a telephone according to claim 10, wherein
    said base has a groove for housing said telephone therein, a pair of said swing arms on both side walls at one end of said groove, said lock device on one side wall at another end of said groove and first guide portion on other side wall of said groove,
    said telephone has a pair of engaging recesses on both side walls at one end thereof,
    an engaging shoulder engaging with engaging portion and biasing surface of said base, and
    a second guide portion engaging with said first guide portion on other side walls at another end thereof.

12. A steering wheel having a telephone according to claims 1, or 2 wherein
    said swing projection has a pair of opposed engaging projections at regular intervals,
    said telephone has a pair of engaging recesses being disposed in both surfaces of the telephone back to back with each other, into which said pair of engaging projection are inserted,
    one of said engaging projection and said engaging recess has a press member urged against the engaging surface thereof by a given urging force.

13. A steering wheel having a telephone according to claim 12, wherein said engaging projections are fixed at the end of said pair of swing lever which pivotally held on said base.

14. A steering wheel having a telephone according to claim 13, wherein said press member comprises a slider portion and a spring for urging said slider portion.

* * * * *